United States Patent [19]

Hartz

[11] 4,137,358

[45] Jan. 30, 1979

[54] MICRO-CRYSTALLINE WAX DIP FORMULATION ADDITIVES FOR PROTECTION OF ADHESIVE-COATED FABRICS AND SINGLE END CORDS

[75] Inventor: Roy E. Hartz, Columbia, S.C.

[73] Assignee: Uniroyal, Inc., New York, N.Y.

[21] Appl. No.: 694,498

[22] Filed: Jun. 10, 1976

[51] Int. Cl.$^2$ ............ B32B 23/02; B32B 27/02; C08L 61/12; C08L 91/06

[52] U.S. Cl. ............ 428/272; 156/110 A; 260/28 P; 260/28.5 R; 428/290; 428/291; 428/390; 428/393; 428/395

[58] Field of Search ............ 260/28 P, 28.5 R; 428/291, 272, 390, 395, 393, 290; 156/110 A

[56] References Cited

U.S. PATENT DOCUMENTS

| | | | |
|---|---|---|---|
| 3,300,426 | 1/1967 | Hunsucker | 156/110 A |
| 3,307,966 | 3/1967 | Shoof | 428/395 |
| 3,330,689 | 7/1967 | Ells et al. | 428/395 |
| 3,443,986 | 5/1969 | Watanabe et al. | 156/110 A |
| 3,549,481 | 12/1970 | Cesare et al. | 428/395 |
| 3,876,457 | 4/1975 | Adams | 428/290 |
| 4,049,603 | 9/1977 | Elmer | 260/28 P |

OTHER PUBLICATIONS

Marsel, Soap and Chemical Specialties, 31(2) 131–134, 157, 159 (1954).

Iyengar, Journal of Applied Polymer Science, (19) 855–863 (1975).

Primary Examiner—J. C. Cannon
Attorney, Agent, or Firm—Thomas A. Beck

[57] ABSTRACT

Adhesive-coated tire cord fabric and similar fabric and single end cords for other end uses can be protected from the adverse effects of exposure to the products of combustion present in fuel oil- or kerosene-fired dryers and curing ovens as well as to atmospheric oxidation, prior to the adhesion of such fabrics to rubber, by incorporating a hydrocarbon wax which is a microcrystalline wax or a Fischer-Tropsch wax in the adhesive formulation.

9 Claims, No Drawings

MICRO-CRYSTALLINE WAX DIP FORMULATION ADDITIVES FOR PROTECTION OF ADHESIVE-COATED FABRICS AND SINGLE END CORDS

This invention relates to the protection of adhesive-coated tire cord, other fabrics, and single end cords, which are subsequently, after storage and/or shipment, to be adhered to rubber layers, from the adverse effects of exposure to the products of combustion present in fuel oil- or kerosene-fired dryers and curing ovens as well as to atmospheric oxidation. It has been found that such fabrics and cords, after exposure to the products of combustion present in fuel oil- or kerosene-fired dryers and curing ovens, demonstrate little or no adhesion to rubber layers in the construction of tires and other end products. In the face of the current natural gas and propane shortage, many textile companies are being forced to use oil or kerosene as the fuel in their treating ovens.

A patent to Watanabe et al., U.S. Pat. No. 3,443,986, proposes the inclusion of certain waxes (natural and synthetic ester-type) in adhesion formulations to improve the adhesive strength of fibrous materials coated therewith. The waxes disclosed in this patent were tested according to the procedures set forth herein and were found to be unsatisfactory.

U.S. Pat. No. 3,300,426 (to Goodyear) teaches the use of cis-1,4-polybutadiene latex to provide an age resistant adhesive composition.

U.S. Pat. No. 3,330,689 (to Deering Milliken Research Corporation) shows the protection of a diene rubber bonding latex from oxidative breakdown by incorporating a paraffin wax therein. The paraffin waxes contemplated melt in the range from 90° to 450° F. The only paraffin wax specifically exemplified (col. 3, line 75 and col. 5, line 20) melts at 138°–143° F. As reported below, a dip containing a paraffin wax (Sunoco 4415) melting at 141° F. gave poor adhesion after exposure to the products of combustion of oil and subsequent oxidation caused by atmospheric pollutants. According to a technical representative of Shell Oil Company, the highest melting hydrocarbon wax (a Fischer-Tropsch wax) has a melting point of 215° F. This maximum melting point for pure hydrocarbon waxes has been confirmed by a technical representative of another wax supplier, Moore & Munger, Inc.

U.S. Pat. No. 3,876,457 (to Adams of Uniroyal) teaches the use of N,N'-ethylenebis-stearamide to improve protection from the adverse effects of atmospheric pollutants. This additive was tested in the oil- and kerosene-fired ovens and found to be unsatisfactory as a result of such exposure.

A paper by Y. Iyengar, *Journal of Applied Polymer Science*, 19, 855–863 (March, 1975), discusses the effects of ozone and UV on tire cord adhesion. At page 857, it is stated that the addition of paraffin wax-microcrystalline wax blends as an aqueous dispersion to a RFL dip significantly improved the adhesion of polyester and nylon-dipped cords after exposure to ozone or UV. However, as is shown by the data presented herein, the use of such blends does not provide the satisfactory results obtainable by the use of the waxes of this invention.

Conventional adhesive dip formulations for application to fabric made from polyamide, aramid, polyester or rayon cord, which is subsequently to be adhered to shaped rubber articles prior to the vulcanization thereof, comprise a dip of a resorcinol-formaldehyde condensate and a latex of a vinyl pyridine-butadiene-styrene terpolymer or of a butadiene-styrene copolymer. It has now been found that the effects of the products of combustion present in fuel oil- or kerosene-fired dryers and curing ovens, as referred to above, and of atmospheric oxidation can be overcome by the incorporation of from about 3 to about 10 weight percent, based on the dry weight of rubber in the resin-rubber dip, of a micro-crystalline wax or a Fischer-Tropsch wax having a melting point of 160° to 215° F. and a molecular weight of up to about 1500, or a mixture of said waxes.

The production of microcrystalline wax from tank bottoms has been described in U.S. Pat. No. 2,443,840 to Stossel. These waxes have a melting point ranging from about 170° to 200° F. They contain essentially long chained normal and branched paraffins with some naphthenic type compounds. Also suitable for use in my invention is the plastic microcrystalline wax of somewhat higher melting point which is derived from various lube oil stocks and petrolatums. This type of wax is described in the article on "Microcrystalline Waxes, Their Manufacture, Properties and Uses in the Paper Industry", by Clary in The Industry and Paper World of February, 1956. These waxes are composed to a large extent of highly branched and naphthenic type hydrocarbons.

Another suitable hydrocarbon wax for my purposes is the Fischer-Tropsch wax. Such waxes are prepared commercially by the gasification reaction of carbon monoxide and hydrogen with a catalyst. They have been described in Chapter 14 of "Fischer-Tropsch Processes", Weil and Lane, Constable & Company, Ltd., London, 1949, as well as in a paper by Marsel, "Fischer-Tropsch Waxes: Their Production, Properties and Uses", Soap and Chemical Specialties 31, No. 2, 131-4, 157, 159 (1954). Such waxes are composed of mostly straight chain linear paraffins with molecular weights of from about 300 to 1500.

The wax additives of this invention can be purchased in the form of a solids emulsion or can be prepared in the form of a slurry by mixing various proportions of the additive and water with an appropriate dispersing system. A suitable procedure for preparing a dispersion or slurry is to mix 49 parts of the wax, 99 parts of distilled water and 2 parts of a dispersing aid, e.g., dioctyl sodium sulfosuccinate, and stirring until a uniform dispersion is formed (all parts are by weight).

The properties which suitable waxes for my purposes should have, and which are possessed by the microcrystalline and Fischer-Tropsch waxes, are:
a. Non-oxidizable;
b. Melting point of 160° to 215° F. and suitable viscosity so as to be able to flow and bloom to the surface of the adhesive for protection;
c. Compatibility so as to be able to migrate into the rubber stock during cure in order to maintain adhesion of the rubber to the cord; and
d. Compatibility with the RFL dip so as not to change the stability of the dip.

The non-hydrocarbon waxes (Chinese, beeswax, etc.) have acid or ester functionality present. None of these materials is an acceptable adhesive protectant in the tests presented herein.

This invention will be described primarily in terms of the preparation of polyamide, aramid, polyester or rayon tire cord fabric for incorporation into shaped rubber tire carcasses with good adhesion. It is understood that the invention is equally applicable to adhesive-coated fabric and single end cords intended for other uses.

In a typical procedure for the application of the adhesive, a tire cord is run through a first dip having the following composition described in U.S. Pat. No. 3,307,966.

COMPOSITION — DIP ONE 1. 22.0g phenol blocked MDI (Hylene MP - DuPont)
2. 1.5g Aerosol O.T. (dioctyl sodium sulfosuccinate)
3. 9.0g Epon 812 (an epoxide)
4. 1200g water The total solids on the cord after this first dip treatment is 0.5%–1.5% (dry weight based upon the weight of the cord).

The cord is then cured for 40 seconds at 445° F. while applying 2.0% stretch. The cord is then run through a second dip (RFL dip) having the following composition:

COMPOSITION — DIP TWO 1. 100g Vinyl pyridine latex (40% solids consisting of 70% butadiene — 15% vinylpyridine — 15% styrene terpolymer (Pyratex)
2. 2.5g Ammonium hydroxide
3. 9.0g Resorcinol-formaldehyde condensation product (Koppers' "Penacolite 2170")
4. 4.5g Formalin (37%) diluted with water to 20% solids
5. Microcrystalline or Fischer-Tropsch Wax — 5 parts wax solids to 100 parts dry rubber solids.

Modified resorcinol-formaldehyde condensation products can also be substituted, e.g., those in which another dihydric phenol is used or in which a third reactive component is included.

The cord is then dried and cured with oil or kerosene as fuel at 390° F. for 90 seconds. The percent solids of RFL picked up on the cord is 2.5 to 4.5% dry weight based upon the weight of the cord. Adhesion results are obtained using the following test method which is also described in U.S. Pat. No. 3,549,481, the contents of which are hereby incorporated by reference herein.

Treated cords are placed in parallel arrangement with 24 ends to the inch. Two pieces of 3 × 4 inches backing stock (a rubber material having a light weight reinforcing fabric in it) are pressed onto the cords by hand with the cord running parallel to the 3 inches side. The two pieces of backing stock are placed so that they cover different portions of the cords and are approximately 1 inch apart. The cord is then trimmed even around the edges of the backing stock. The cord side of the backing stock is then pressed by hand onto an adhesion stock. A typical formulation is a 35/45/20 blend of natural rubber, styrene-butadiene rubber and cis-butadiene rubber tire skim stock containing 50 parts of carbon black, 1.5 parts of stearic acid, 25 parts of reclaimed rubber, 10 parts of zinc oxide, 1 part of antioxidant, 5 parts of pine tar, 1 part of mercaptobenzothiazole, 0.1 part of diphenyl guanidine and 3.2 parts of sulfur. Care is taken not to touch the cord or the adhesion surface of the backing stock or the adhesion stock. The articles formed are trimmed and cut in half. A 1 × 4 inches aluminum foil or Holland cloth separator is placed on the exposed surface of the adhesion stock on one of the specimen halves, with the separator being aligned along one 4 inches edge. The specimen halves are laminated together so that adhesion stock contacts adhesion stock except in the area in which the separator is present.

The assembly is placed in a press and cured for 6 minutes at 350° F. platen temperature and 200 psi pressure.

The resultant article is cut into four 1 × 3 inches strips and the two end strips are discarded.

The separator is removed from the end of the remaining middle strips, the two end portions (referred to as tabs) are spread apart and maintained in that condition and the strips are placed in an Instron oven at 250° F. for 30 minutes. Subsequently, the tabs of each article are placed in the jaws of an Instron Tester, and the jaws of the tester are separated at a rate of 5 inches per minute and a chart speed of 0.5 inch per minute. Sufficient force in the tester is obtained to separate the article along its length. The separated surfaces are then examined to see how much of the cord has become visible due to stripping of the rubber from the cord. This is recorded according to the following scale:

| Rating | | | |
|---|---|---|---|
| 5 | 100% Rubber Failure | No Cord Visible | |
| 4 | 75% " | 25% | " |
| 3 | 50% " | 50% | " |
| 2 | 25% " | 75% | " |
| 1 | No " | 100% | " |

Thus, the highest value of the scale indicates that the adhesion was so strong that the failure occurred in the rubber stock; the lowest value of the scale indicates a weak adhesion bond, failure having occurred at the interface of the rubber stock and the cord rather than in the rubber stock itself.

A desirable procedure for storing and shipping the rolls of adhesive dipped tire cord fabric is to wrap each one in a polyethylene bag, draw a vacuum on the bag and tape the previously open end of the bag. Additional packing may be desirable prior to shipment, but, with this treatment, there is no problem concerning atmospheric pollutants and UV light. It is only after the roll of tire cord fabric is withdrawn from the polyethylene bag in a badly polluted atmosphere that one of the problems solved by this invention is encountered.

The atmospheric pollutants which cause the most trouble for fabric adhesive coatings are the oxides of nitrogen and ozone. These are particularly detrimental in the presence of high temperature, low humidity and exposure to light, the ultraviolet light being most damaging. Consequently, for testing purposes, a 6 × 6 feet room was equipped with apparatus necessary to provide the following conditions:

| | |
|---|---|
| Temperature | - 100° F. + |
| Relative Humidity | - 20% |
| Ozone Concentration | - 10 to 25 parts/hundred million |
| Nitrogen Dioxide | - 8 to 15 parts/hundred million |
| Total Light | - 100 foot candles |
| Ultraviolet and Infrared Light | - 160 microwatts/cm$^2$ |

Using this laboratory accelerated testing procedure, the use of the additives of this invention increases the resistance to adhesion loss by at least a factor of three in time. (Example 3 of the above Adams patent shows loss of adhesion after 15 minutes exposure without protectant, while the adhesion after 1 hour with protectant is still perfect in Example II below.) This is of vital importance since the fabric must retain good adhesion throughout all operations in conversion into a tire, a conveyor belt, etc. In general, those samples which retain an adhesion appearance of 4.0 or greater after one hour in this test have been found to process without problems under factory conditions.

EXAMPLES

EXAMPLE I

This example illustrates the application of the novel additives of the present invention to protect polyester tire cord from the adverse effects of fuel oil or kerosene as the fuel for the drying and curing oven, prior to adhesion of such fabrics to rubber. Twisted 3440 denier, polyester (polyethylene terephthalate) tire cord consisting of 3-ply cord (in which each ply has 9.2 "Z" turns in the singles and 9.2 "S" turns in the plying operation) was put through the dip and heating procedure set forth above.

Table I summarizes the comparison of initial adhesion of the polyethylene terephthalate tire cord treated with oil or kerosene as fuel with and without additive.

Table I

Initial Adhesion of Polyethylene Terephthalate With Microcrystalline or Fischer-Tropsch Wax

| Additive | Parts Additive[a] | Initial Appearance/ Lbs. Pull |
|---|---|---|
| None | 0 | 3.3/25.0 |
| N,N'-ethylene bis-stearamide | 5 | 3.5/24.0 |
| Microcrystalline Emulsion[b] | 3 | 4.8/30.0 |
| Microcrystalline Emulsion[b] | 6 | 5.0/31.0 |
| Fischer-Tropsch Dispersion[c] | 3 | 4.8/30.5 |
| Fischer-Tropsch Dispersion[c] | 5 | 5.0/31.0 |

[a]-g. wax solids per 100 g. dry rubber solids (Latex)
[b]-Mobilcer Q emulsion of microcrystalline wax (m.p.: 165° F.)
[c]-Moore and Munger's H-1-N-3 Fischer-Tropsch Wax (m.p.: 170° F.)

EXAMPLE II

This example illustrates the application of the additive of the present invention to protect polyethylene terephthalate tire cord in fuel oil or kerosene fired ovens plus protection from adverse effects of oxidation caused by atmospheric pollutants.

A twisted 3-ply, 3440 denier polyester tire cord as described in Example I is similarly dipped and cured with kerosene or fuel oil heat.

The treated and exposed polyester cords are then built into pads and tested as described above. Table II summarizes the comparison of the initial and exposed adhesion of the polyethylene terephthalate tire cord with and without the additive.

Table II

Exposed Adhesion of Polyethylene Terephthalate with Fischer-Tropsch or Microcrystalline Wax

| | | Appearance/Lbs. Pull | | |
|---|---|---|---|---|
| Additive | Parts Additive[a] | Initial | 30 Min. Exposure[b] | 60 Min. Exposure[b] |
| None | 0 | 3.3/25.0 | 1.0/19.0 | 1.0/15.0 |
| Microcrystalline Emulsion[c] | 3 | 4.8/30.0 | 4.6/24.5 | |
| Emulsion[c] | 6 | 5.0/31.0 | 5.0/28.5 | 5.0/30.0 |
| Fischer-Tropsch Dispersion[d] | 3 | 4.8/30.5 | 3.5/25.5 | |
| Dispersion[d] | 5 | 5.0/31.0 | 5.0/28.0 | 5.0/30.0 |

[a]-g. wax per 100 g. dry rubber solids (Latex)
[b]-Exposure 10 pphm Ozone and 10 pphm nitrogen oxides
[c]-Mobilcer Q Wax Emulsion
[d]-Moore and Munger's H-1-N-3 wax

EXAMPLE III

This example illustrates the application of the additives of the present invention to protect polyamide tire cord using fuel oil or kerosene as the fuel for the drying and curing oven plus protection from adverse effects of oxidation caused by atmospheric pollutants.

Twisted 1680 denier polyamide (nylon 6,6) tire cord consisting of 2-ply cord is passed through a fuel oil- or kerosene-fired oven at 445° F. for a period of 40 seconds while applying 9.5% stretch. The cord is then run through a dip of the composition as Dip II (RFL) (see above). The cord is then processed for initial adhesion and exposed adhesion as described above.

Table III

Initial and Exposed Adhesion of Nylon 6,6 with Fischer-Tropsch or Microcrystalline Wax

| | | Appearance/Lbs. Pull | | |
|---|---|---|---|---|
| Additive | Parts Additive[a] | Initial | 30 Min. Exposure[b] | 60 Min. Exposure[b] |
| None | 0 | 4.2/26.0 | 3.0/27.2 | 1.0/28.5 |
| Microcrystalline Emulsion[c] | 6 | 5.0/31.0 | 5.0/26.0 | 4.3/37.5 |
| Fischer-Tropsch Dispersion[d] | 5 | 5.0/32.0 | 4.9/35.0 | 4.9/38.5 |

[a]-g. wax by weight per 100 g. dry rubber solids
[b]-Exposure 10 pphm Ozone and 10 pphm nitrogen oxides
[c]-Mobilcer Q Wax Emulsion
[d]-Moore and Munger's H-1-N-3 wax

EXAMPLE IV

Kevlar is an aromatic polyamide (aramid) produced by duPont. Twisted 4570 denier Kevlar (1500/3-ply) tire cord is treated and tested similarly to polyethylene terephthalate as described above.

Table IV

Initial and Exposed Adhesion for Kevlar with Fischer-Tropsch or Microcrystalline Wax

| | | Appearance/Lbs. Pull | | |
|---|---|---|---|---|
| Additive | Parts Additive[a] | Initial | 30 Min. Exposure[b] | 60 Min. Exposure[b] |
| None | 0 | 4.8/31.5 | 1.0/18.5 | 1.0/15.5 |
| Microcrystalline Emulsion[c] | 6 | 5.0/38.0 | 4.8/32.5 | 4.8/27 |
| Fischer-Tropsch Dispersion[d] | 5 | 5.0/33.5 | 4.5/32.5 | 3.5/26.5 |

[a]-g. wax per 100 g. dry rubber solids (Latex)
[b]-Exposure 100 pphm Ozone and 10 pphm nitrogen oxides
[c]-Mobilcer Q wax emulsion
[d]-Dispersion of Moore and Munger's H-1-N-3 wax

EXAMPLE V

This example illustrates the use of an additive of the present invention with rayon tire cord. The 3300 denier (1650/2-ply) cord is run through the RFL dip (see above) and then dried and cured at 370° F. for 90 seconds.

Table V

Initial and Exposed Adhesion for Rayon with Microcrystalline Wax

| | | Appearance/Lbs. Pull | | |
|---|---|---|---|---|
| Additive | Parts Additive[a] | Initial | 30 Min. Exposure[b] | 60 Min. Exposure[b] |
| None | 0 | 4.0/32.0 | 1.0/22.0 | 1.0/21.0 |
| Microcrystalline Emulsion[c] | 6 | 4.0/36.0 | 4.0/28.5 | 4.0/26.0 |

[a]-g. wax by weight per 100 g. dry rubber solids
[b]-10 pphm Ozone and 10 pphm oxides of nitrogen
[c]-Mobilcer Q wax emulsion

EXAMPLE VI

Cetyl stearate has been set forth as a desirable additive in U.S. Pat. No. 3,443,986. This additive was tested at 10 pphm ozone with polyester cord. The results summarized in Table VI reveal the unsatisfactory nature of cetyl stearate as an adhesive additive for the purposes of this invention.

Table VI

| Additive | Initial Adhesion | | 30 Min. Exposure* | | 1 Hr. Exposure* | |
|---|---|---|---|---|---|---|
| | App. | Lbs. Pull | App. | Lbs. Pull | App. | Lbs. Pull |
| None | 5.0 | 33.5 | 4.0 | 28.5 | 1.5 | 25.0 |
| 5% cetyl stearate** | 5.0 | 33.0 | 1.2 | 23.5 | 1.0 | 26.5 |
| 10% cetyl stearate** | 5.0 | 33.0 | 1.0 | 25.5 | 1.0 | 25.5 |

*Exposure 10 pphm ozone, 10 pphm oxides of nitrogen
**Dispersion in water

EXAMPLE VII

Paracol 404C is a microcrystalline wax — paraffin wax blend of m.p. 155° F. The unsatisfactory results obtained using the foregoing procedures are set forth in Table VII.

Table VII
Paracol 404C Results[a]

| | | Adhesion | | | | | |
|---|---|---|---|---|---|---|---|
| | | Paracol 404C | | | Mobilcer Q | | |
| Fiber | Fuel | Initial | 30 Min. Exposure | 60 Min. Exposure | Initial | 30 Min. Exposure | 60 Min. Exposure |
| Kevlar | Oil | 31.5/5.0[b] | 28.0/3.5 | 27.0/2.5 | 38.0/5.0 | 32.5/4.8 | 27.0/4.8 |
| Nylon | Oil | 32.0/4.8 | 27.0/4.5 | 25.0/3.7 | 31.0/5.0 | 26.0/5.0 | 37.5/4.3 |
| Polyester | Oil | 39.5/4.9 | 29.5/3.5 | 27.5/2.5 | 31.0/5.0 | 28.5/5.0 | 30.0/5.0 |
| Polyester | Gas | 36.5/4.7 | 27.5/2.5 | 22.0/2.5 | 34.5/5.0 | 39.5/4.9 | 38.0/4.9 |
| Nylon | Gas | 37.0/5.0 | 27.0/4.0 | | 31.0/5.0 | 26.0/5.0 | 37.5/4.3 |

[a]-6 parts (g.) additive to 100 parts (g.) dry rubber solids (Latex)
[b]-Lbs./App.

EXAMPLE VIII

Similarly unsatisfactory results were obtained when using American Cyanamid latices of 100% paraffin waxes.

Table VIII
Initial Adhesion

| Wax Additive | Parts | on Polyester[a] | M.P. of Wax |
|---|---|---|---|
| Am. Cyan. 201A | 6 | 1.0/22.0 | 120° F. |
| Am. Cyan. 251S | 6 | 2.0/28.0 | 125° F. |
| Mobilcer Q Microcrystalline | 6 | 5.0/38.5 | 165° F. |

[a]-App./Lbs. Pull

EXAMPLE IX

A series of special waxes was evaluated as protectants. They were chosen to represent several classes.
A. Sunoco 4415 (m.p. — 141° F.) — paraffin wax of same m.p. as example in above Deering-Milliken patent.
B. Three waxes of paraffin-micrycrystalline blends mentioned in Iyengar's paper in *Journal of Applied Polymer Science* for March, 1975.
  1. J1440 (56% emulsion), Heveatex Co.
  2. "Vultex" 8 (40% emulsion), General Latex & Chemical Corp.
  3. Heliozone, duPont.
C. Microcrystalline waxes.
  1. Shellmax 400, Shell Oil — microcrystalline.
  2. Multiwax 445, Witco — microcrystalline.
D. Polyethylene (Bareco 2000 Polywax) Micronized — molecular weight is 2000, and m.p. is 260° F.

The preparation of wax dispersions was required for the non-emulsions. The Bareco 2000 micronized wax was dispersed by the sodium sulfosuccinate procedure described above. An alternative procedure was used for the other waxes with the following formulation: wax — 10g.; oleic acid — 2.8g.; triethanolamine — 0.5g.; and water — 23.8g. The wax is melted and oleic acid added. A preheated water-triethanolamine solution is then added to the wax mixture, while stirring is conducted with a high speed stirrer.

Twisted 3440 denier, polyethylene terephthalate tire cord was treated and tested as described in Examples I and II. The initial and exposed adhesion results are summarized in Table IX for the gas versus oil fired oven trials.

Table IX

| | | Strip Adhesion | | | | | |
|---|---|---|---|---|---|---|---|
| | | Gas Fuel | | | Oil Fuel | | |
| Wax Additive | Wax M.P. (° F.) | Initial | 30 Min. Exp. | 60 Min. Exp. | Initial | 30 Min. Exp. | 60 Min. Exp. |
| 1. None | — | 38/5.0 | 18/1.0 | 16/1.0 | 30/4.0 | 18/1.0 | 16/1.0 |
| 2. Mobilcer Q Control | 165 | 31/5.0 | 34/5.0 | 31/5.0 | 35/5.0 | 28/4.0 | 21/4.0 |
| 3. J1440 | 150–155 | 40/5.0 | 33/5.0 | 31/5.0 | 30/4.5 | 27/3.5 | 20/2.0 |
| 4. Vultex "8" | 150–155 | 31/5.0 | 16/1.0 | 16/1.0 | 15/1.0 | 17/1.0 | 12/1.0 |
| 5. Heliozone | 150–155 | 33/5.0 | 32/5.0 | 31/5.0 | 34/4.8 | 28/3.0 | 23/2.0 |
| 6. Sunoco 4415 | 141 | 31/5.0 | 33/4.8 | 31/4.8 | 32/4.8 | 16/1.0 | 16/1.0 |
| 7. Multiwax 445 | 180 | 37/5.0 | 33/4.7 | 28/4.0 | 31/5.0 | 32/4.8 | 29/4.0 |
| 8. Bareco 2000 Polywax | 260 | 32/5.0 | 23/1.0 | 15/1.0 | 22/2.0 | 15/1.0 | 14/1.0 |
| 9. Shellmax 400 | 177 | 32/5.0 | 33/4.8 | 30/4.5 | 35/4.5 | 29/4.3 | 23/3.8 |

All waxes at 6g wax/100g dry rubber from rubber latex.

The following conclusions are drawn from the Table IX data:

1. Sunoco 4415, m.p. 141° F., the material representing the specific Deering-Milliken wax, showed poor exposure resistance after oil firing.
2. The three materials discussed in Iyengar's paper exhibited poor initial (Vultex "8") or exposed (J1440, Heliozone) adhesion retention for the oil-fired samples.
3. The Bareco 2000, m.p. 260° F., exhibited poor initial adhesion for oil firing and poor exposed for gas and oil.

4. The Shellmax 400 and Multiwax 445 (both within the scope of this invention) gave good initial and exposed adhesion. cl EXAMPLE X Table X presents a list of materials which were unsatisfactory for the purposes of this invention with polyester cord under the conditions described above. All of the materials were tried at 5% levels based on dry rubber solids.

Table X

The following materials had initial adhesion values from oil heat drying and curing equal to or lower than the no additive control in Example I. (<3.3 appearance):

| | Chemical Class |
|---|---|
| Trimethylborate | Borate ester |
| Irganox 1076 | Phenolic |
| Irganox 1098 | " |
| Irganox 1035 | " |
| Irganox 1010 | " |
| Irganox 1093 | " |
| American Cyanamid's 2246 | " |
| Triphenylstibine | Organometallic |
| Delvet 65 Special Emulsion | Chloroparaffin |
| Delvet Special Latex | |
| Carstab DLTDP | Dilauryl thiodipropionate |
| Petrolite C-7500 | Oxidized Fischer-Tropsch Wax |
| Moore and Munger's A-1 | " |
| | (Both contain ester and acid groups) |
| Stearic acid | |
| Distearylsulfoxydipropionate | Sulfoxydipropionate ester |
| Hexadecyloxadiazole | Oxadiazole |

It is evident from the foregoing data that the goals of this invention are amply achieved by incorporating a microcrystalline or Fischer-Tropsch wax in the adhesive dips used in treating tire cord and the like.

What is claimed is:

1. A fabric or single end cord made from a polyamide, aramid, polyester, or rayon cord and coated with 3 to 10 weight percent, based on the fabric weight, of a dried adhesive comprising: (1) a resorcinolformaldehyde condensate, (2) a vinyl pyridine-butadiene-styrene rubbery terpolymer or butadiene-styrene rubber copolymer composition, and (3) a wax composition consisting essentially of a microcrystalline wax having a melting point of 160° to 215° F. and a molecular weight of up to about 1,500, said percent being based on the dry weight of rubber in the resin-rubber dip, said coated fabric or single end cord having the characteristic of better retention of adhesion after exposure to the products of combustion present in fuel oil or kerosene-fired dryers and curing ovens and oxidation caused by atmospheric pollutants.

2. The product of claim 1 wherein the fabric or cord is nylon 6,6.

3. The product of claim 1 wherein the fabric or cord is an aramid.

4. The product of claim 1 wherein the fabric or cord is polyethylene terephthalate.

5. The product of claim 1 wherein the fabric or cord is rayon.

6. The product of claim 1 wherein said microcrystalline wax is prepared using the Fischer-Tropsch process.

7. An adhesive dip formulation for application to fabric or single end cord made from a polyamide, aramid, polyester or rayon cord which is subsequently to be adhered to rubber in vulcanized shaped rubber articles comprising a dip of (1) a resorcinol-formaldehyde condensate, (2) a latex of vinyl pyridine-butadiene-styrene rubbery terpolymer or butadiene-styrene rubber copolymer and (3) from about 3 to about 10 weight percent of a wax composition, wherein the wax in said dip formulation consists essentially of a microcrystalline wax having a melting point of 160° to 215° F. and a molecular weight of up to about 1500, said percent being based on the dry weight of rubber in the resin-rubber dip.

8. The formulation of claim 7 wherein the rubbery terpolymer of claim 1 is a vinyl pyridine-butadiene-styrene rubbery terpolymer of 15-70-15 weight percent composition, respectively.

9. The formulation of claim 7 wherein said microcrystalline wax is prepared using the Fischer-Tropsch process.

* * * * *